United States Patent
Ohtani et al.

(10) Patent No.: US 10,828,807 B2
(45) Date of Patent: Nov. 10, 2020

(54) METHOD FOR MANUFACTURING MOLDED ARTICLE

(71) Applicant: Mitsubishi Gas Chemical Company, Inc., Tokyo (JP)

(72) Inventors: Akio Ohtani, Gifu (JP); Asami Nakai, Gifu (JP); Masataka Kaji, Ishikawa (JP); Mitsuro Takagi, Ishikawa (JP); Nobuhiko Matsumoto, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 384 days.

(21) Appl. No.: 15/565,875

(22) PCT Filed: Apr. 1, 2016

(86) PCT No.: PCT/JP2016/060892
§ 371 (c)(1),
(2) Date: Oct. 11, 2017

(87) PCT Pub. No.: WO2016/167136
PCT Pub. Date: Oct. 20, 2016

(65) Prior Publication Data
US 2018/0056553 A1    Mar. 1, 2018

(30) Foreign Application Priority Data
Apr. 14, 2015  (JP) ................. 2015-082750

(51) Int. Cl.
*B29C 43/00* (2006.01)
*B29C 43/34* (2006.01)
(Continued)

(52) U.S. Cl.
CPC ............ *B29C 43/003* (2013.01); *B29C 43/02* (2013.01); *B29C 43/203* (2013.01); *B29C 43/34* (2013.01);
(Continued)

(58) Field of Classification Search
None
See application file for complete search history.

(56) References Cited

U.S. PATENT DOCUMENTS 2,833,685 A * 5/1958 Lawrence ............... B29C 63/00
264/132
3,713,962 A * 1/1973 Ackley ................... B29C 70/08
428/364
(Continued)

FOREIGN PATENT DOCUMENTS

DE  3789473 T2  7/1994
EP  0255314 A2  2/1988
(Continued)

OTHER PUBLICATIONS

Extended European Search Report issued in corresponding European Application No. 16779927.9 dated Nov. 6, 2018 (9 pages).
(Continued)

*Primary Examiner* — Edmund H Lee
(74) *Attorney, Agent, or Firm* — Fitch, Even, Tabin & Flannery LLP

(57) ABSTRACT

Provided is method for manufacturing a molded article that has a first portion, and a second portion that rises up from the first portion, the method comprising: placing a second material on a surface of a first material; the first material containing a reinforcing fiber (A) with a length exceeding 30 mm and a thermoplastic resin (B), the reinforcing fiber (A) being dispersed in the first material, and, the thermoplastic resin (B) being not substantially impregnated into the reinforcing fiber (A), and the second material containing a reinforcing fiber (a) with a length of 1 to 30 mm and a thermoplastic resin (b), the reinforcing fiber (a) being dispersed into the second material, and, the thermoplastic resin (b) being not substantially impregnated into the reinforcing fiber (a), and simultaneously forming the first portion and
(Continued)

the second portion by one stroke of pressing, with a cohesive strength of the thermoplastic resin (B) and the thermoplastic resin (b) of 2 N/15 mm or larger, where the cohesive strength being measured by stacking a 15 mm-wide, 0.03 mm-thick film derived from the thermoplastic resin (B), and a 15 mm-wide, 0.03 mm-thick film derived from the thermoplastic resin (b); pressing the stack under a pressure of 0.1 MPa, at a temperature 1° C. higher than the melting point of the thermoplastic resin (B) or the thermoplastic resin (b), whichever is higher, for two seconds, so as to heat seal the films partially; pulling the films at unsealed portions in the direction 180° away from each other; and finding the force at which the heal-sealed portion separates, or the force at which the resin films rupture before being separated.

22 Claims, 3 Drawing Sheets

(51) Int. Cl.
*C08J 5/04* (2006.01)
*B29C 43/02* (2006.01)
*B29C 43/20* (2006.01)
*B29K 77/00* (2006.01)
*B29K 105/12* (2006.01)

(52) U.S. Cl.
CPC ............... *C08J 5/04* (2013.01); *C08J 5/042* (2013.01); *B29K 2077/00* (2013.01); *B29K 2105/12* (2013.01); *C08J 2323/12* (2013.01); *C08J 2377/06* (2013.01)

(56) References Cited

U.S. PATENT DOCUMENTS

| | | | | |
|---|---|---|---|---|
| 4,044,188 A | * | 8/1977 | Segal | B29C 70/025 428/297.4 |
| 4,098,943 A | * | 7/1978 | Degginger | B29C 70/00 428/300.7 |
| 4,385,955 A | * | 5/1983 | Doerfling | B29C 37/0025 156/245 |
| 4,758,395 A | * | 7/1988 | Zion | B29C 70/08 264/135 |
| 9,011,747 B2 | * | 4/2015 | Tateyama | B29C 43/18 264/257 |
| 2006/0068175 A1 | * | 3/2006 | Karam | B32B 5/28 428/195.1 |
| 2009/0252916 A1 | * | 10/2009 | Heidrich | B32B 5/26 428/86 |
| 2011/0304069 A1 | | 12/2011 | Etoh et al. | |
| 2014/0124976 A1 | * | 5/2014 | Tateyama | B29C 43/18 264/257 |
| 2015/0376353 A1 | | 12/2015 | Takebe et al. | |
| 2016/0010246 A1 | | 1/2016 | Nakai et al. | |

FOREIGN PATENT DOCUMENTS

| | | |
|---|---|---|
| JP | H05-09301 A | 1/1993 |
| JP | H07-68580 A | 3/1995 |
| JP | 2005-179829 A | 7/2005 |
| JP | 2013-173334 A | 9/2013 |
| JP | 2014-50981 A | 3/2014 |
| JP | 2014-54764 A | 3/2014 |
| JP | 2014-172241 A | 9/2014 |
| JP | 2014-173196 A | 9/2014 |
| TW | 201443113 A | 11/2014 |
| WO | 2005/051624 A2 | 6/2005 |
| WO | 2009/142291 A1 | 11/2009 |

OTHER PUBLICATIONS

Office Action dated Apr. 2, 2019, in corresponding Taiwanese Patent Application No. 105111421.
Office Action dated Dec. 30, 2019, in corresponding Chinese Patent Application No. 201680021543.9.
International Search Report for PCT/JP2016/060892 dated Jun. 28, 2016; English translation submitted herewith (6 pages).

\* cited by examiner

[Fig. 1]
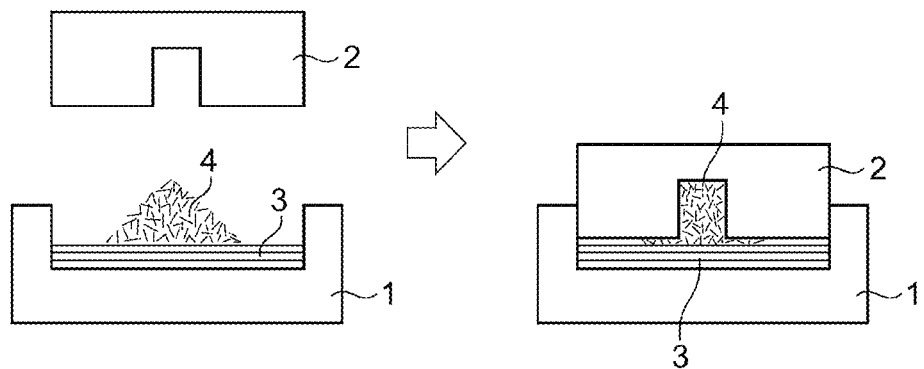
[Fig. 2]
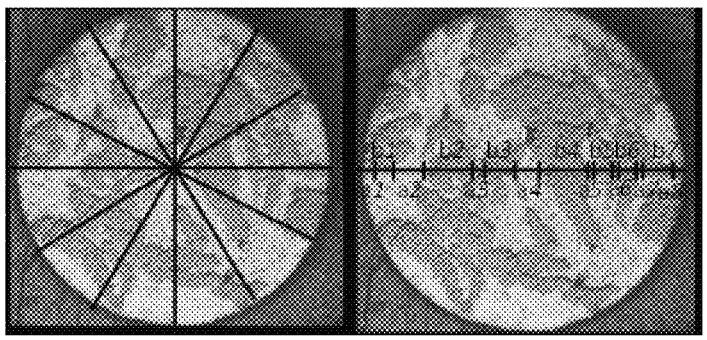
[Fig. 3]
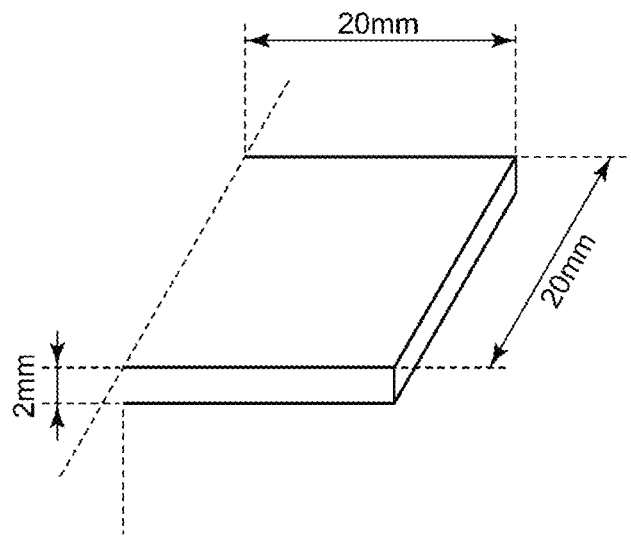

[Fig. 4]
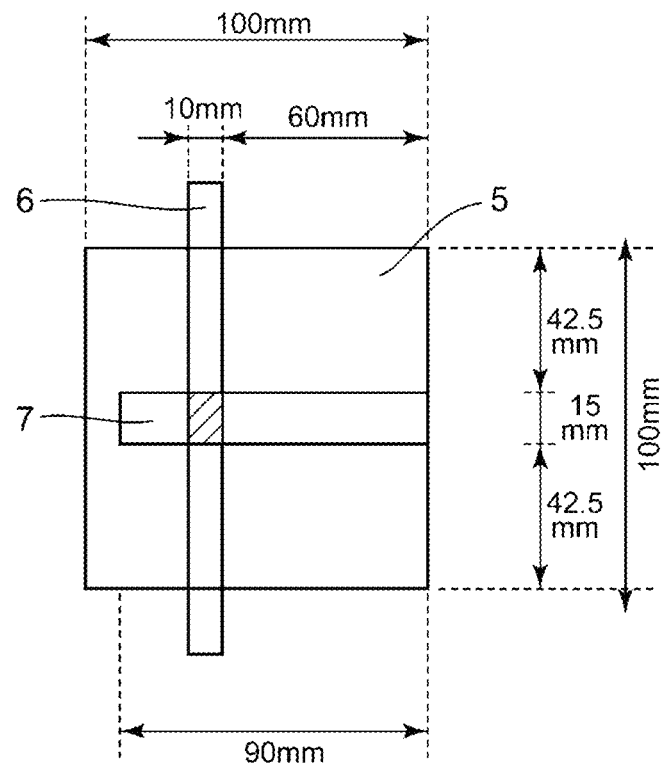
[Fig. 5]
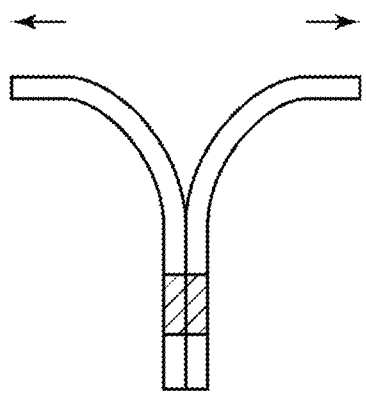

[Fig. 6]
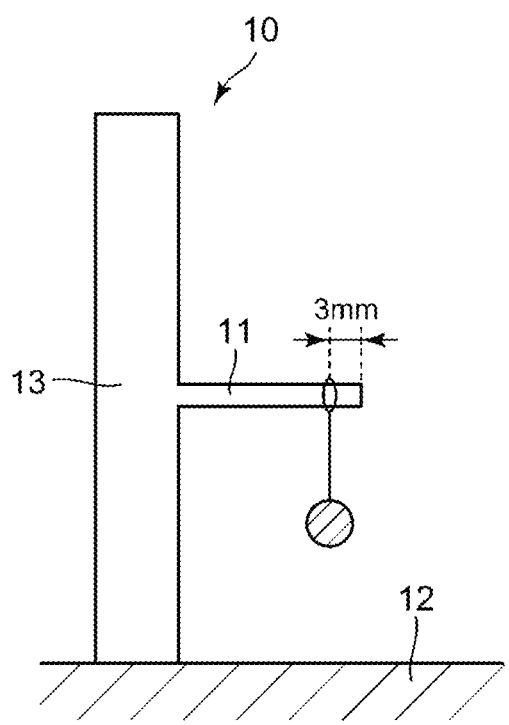

METHOD FOR MANUFACTURING MOLDED ARTICLE

CROSS-REFERENCE TO RELATED APPLICATIONS

This application is a U.S. national phase application filed under 35 U.S.C. § 371 of International Application PCT/JP2016/060892, filed on Apr. 1, 2016, designating the United States, which claims priority from Japanese Application Number 2015-082750, filed Apr. 14, 2015.

Field of the Invention

This invention relates to a method for manufacturing a molded article, and in particular to a method for manufacturing a molded article having a raised part such as a rib.

Background of the Invention

In recent years, fiber reinforced thermoplastic resin material (fiber-reinforced thermoplastics, or FRP) that contains fiber and thermoplastic resin has attracted public attention. The FRP, featured by its light weight and high strength, has widely been used for miscellaneous applications.

Meanwhile, investigations have been made on manufacture of a molded article having a raised part, using the above-described FRP.

For example, Patent Literature 1 describes a process of arranging sheets or pellets on the surface of a prepreg, followed by heating.

Patent Literature 2 describes a process of molding a prepreg under pressure, so as to drive a part of the prepreg into a portion of a die corresponded to the raised part.

Now the prepreg described in Patent Literature 1 and Patent Literature 2 means a molding intermediate having therein a resin substantially impregnated into a reinforcing fiber.

On the other hand, the present applicants have ever disclosed a commingled yarn whose fiber component is composed of a thermoplastic resin fiber and a reinforcing fiber. The commingled yarn is characterized in that the resin is substantially not impregnated into the reinforcing fiber.

CITATION LIST

Patent Literatures

[Patent Literature 1] JP-A-2013-173334
[Patent Literature 2] JP-A-2014-1722241
[Patent Literature 3] JP-A-2014-173196

SUMMARY OF THE INVENTION

In both of Patent Literatures 1 and 2, the prepreg is molded under heating. Although known as a beneficial material, the prepreg described in Patent Literature 1 and Patent Literature 2 typically needed to undergo heating process twice or more, once for impregnating the thermoplastic resin into the continuous reinforcing fiber, and another once for heat process for producing a molded article. The number of heating processes has been apt to further increase, since such prepreg is often stacked with a sheet or tape obtained after the above-described impregnation, and then subjected to press-molding. It was also found that, since the prepreg in Patent Literature 1 is heated while keeping the pellets or the like arranged on the surface thereof, so that the prepreg would be damaged by the pellets during the heat process. There is therefore a need to provide a novel method for manufacturing a molded article having a raised part such as a rib.

It is therefore an object of this invention to solve the problem, and to provide a novel method for manufacturing a molded article having a raised part, without using the prepreg as described above.

Under such situation, the above-described problem was solved by a means <1>, and preferably by means <2> to <9> below.

<1> A method for manufacturing a molded article that has a first portion, and a second portion that rises up from the first portion, the method comprising: placing a second material on a surface of a first material; the first material containing a reinforcing fiber (A) with a length exceeding 30 mm and a thermoplastic resin (B), the reinforcing fiber (A) being dispersed in the first material, and, the thermoplastic resin (B) being not substantially impregnated into the reinforcing fiber (A), and the second material containing a reinforcing fiber (a) with a length of 1 to 30 mm and a thermoplastic resin (b), the reinforcing fiber (a) being dispersed into the second material, and, the thermoplastic resin (b) being not substantially impregnated into the reinforcing fiber (a), and simultaneously forming the first portion and the second portion by one stroke of pressing, with a cohesive strength of the thermoplastic resin (B) and the thermoplastic resin (b) of 2 N/15 mm or larger, where the cohesive strength being measured by stacking a 15 mm-wide, 0.03 mm-thick film derived from the thermoplastic resin (B), and a 15 mm-wide, 0.03 mm-thick film derived from the thermoplastic resin (b); pressing the stack under a pressure of 0.1 MPa, at a temperature 1° C. higher than the melting point of the thermoplastic resin (B) or the thermoplastic resin (b), whichever is higher, for two seconds, so as to heat seal the films partially; pulling the films at unsealed portions in the direction 180° away from each other; and finding the force at which the heal-sealed portion separates, or the force at which the resin films rupture before being separated.

<2> The method for manufacturing a molded article of <1>, wherein the first material is a commingled yarn that contains, as the fiber components thereof, the reinforcing fiber (A) with a length exceeding 30 mm, and a thermoplastic resin fiber that contains the thermoplastic resin (B); or, a composite material that uses the commingled yarn.

<3> The method for manufacturing a molded article of <1> or <2>, wherein the second material is a material chopped into 1 to 30 mm length from a comingled yarn that contains, as the fiber components thereof, the reinforcing fiber (A) with a length exceeding 30 mm, and a thermoplastic resin fiber that contains the thermoplastic resin (B).

<4> The method for manufacturing a molded article of any one of <1> to <3>, wherein each of the thermoplastic resin (B) and the thermoplastic resin (b) independently contain, as the major component thereof, polyolefin resin, polyamide resin, polyester resin, polyether ketone, polyethersulfone, or thermoplastic polyetherimide.

<5> The method for manufacturing a molded article of any one of <1> to <3>, wherein each of the thermoplastic resin (B) and the thermoplastic resin (b) independently contains a polyamide resin as the major component.

<6> The method for manufacturing a molded article of any one of <1> to <3>, wherein each of the thermoplastic resin (B) and the thermoplastic resin (b) independently contains, as the major component, a polyamide resin that contains a diamine-derived structural unit and a dicarboxylic acid-derived structural unit, where 50 mol % or more of the diamine-derived structural unit being derived from xylylenediamine.

<7> The method for manufacturing a molded article of any one of <1> to <6>, wherein the second portion is 10 mm wide or thinner at the thinnest portion thereof.

<8> The method for manufacturing a molded article of any one of <1> to <7>, wherein each of the reinforcing fiber (A) with a length exceeding 30 mm, and the reinforcing fiber (a) with a length of 1 to 30 mm, is at least one of carbon fiber, aramid fiber and glass fiber.

<9> The method for manufacturing a molded article of any one of <1> to <8>, wherein each of the ratio of reinforcing fiber (A) with a length exceeding 30 mm in the first material, and the ratio of the reinforcing fiber (a) with a length of 1 to 30 mm in the second material, is 30% by volume or larger.

This invention now makes it possible to provide a novel method for manufacturing a molded article having a raised part such as a rib, without using the prepreg as described above.

BRIEF DESCRIPTION OF DRAWINGS

FIG. 1 A schematic drawing illustrating steps of press molding in this invention.

FIG. 2 A drawing illustrating an exemplary image processing in a method for measuring dispersion.

FIG. 3 A schematic drawing illustrating a shape of a protruded part (second portion) in an embodiment of this invention.

FIG. 4 A schematic drawing illustrating a heat-sealed portion and a cut-off portion of a laminated film for cohesive strength test in the embodiment of this invention.

FIG. 5 A schematic drawing illustrating a stacked film pulled in a direction of 180° for cohesive strength test in the embodiment of this invention.

FIG. 6 A schematic drawing illustrating a method for measuring cohesiveness of the first portion and the second portion in the embodiment of this invention.

DESCRIPTION OF EMBODIMENTS

This invention will be detailed below. Note that all numerical ranges in this specification given using "to", placed between numerals, mean the ranges containing both numerals as the lower and upper limits.

The length of fiber in this invention is weight-average fiber length, determined by randomly cutting the molded article at arbitrary positions to produce test pieces, baking the test pieces in an electric furnace at 500° C. to burn out the thermoplastic resin component only, measuring the weight and length of the residual fiber, finding the ratio of content of fiber which is defined by percentage of weight of each test piece as compared with the weight measured before combustion, and then finding the weight-average fiber length which is defined by a weight-average value of the fiber length.

In this invention, the "major component" of resin means a component whose ratio of content is largest of all components in the resin, unless otherwise specifically noted, and is preferably a component that accounts for 51% by weight or more of the resin component, and more preferably a component that accounts for 80% by weight or more of the resin component.

The "thickness" of film or the like in this invention is given by an average value obtained after measuring the thickness at 10 arbitrary points.

The method for manufacturing a molded article is a method for manufacturing a molded article that has a first portion, and a second portion that rises up from the first portion. The method is characterized by including: placing a second material on the surface of a first material; the first material containing a reinforcing fiber (A) with a length exceeding 30 mm and a thermoplastic resin (B), the reinforcing fiber (A) being dispersed in the first material, and, the thermoplastic resin (B) being not substantially impregnated into the reinforcing fiber (A), and the second material containing a reinforcing fiber (a) with a length of 1 to 30 mm and a thermoplastic resin (b), the reinforcing fiber (a) being dispersed into the second material, and, the thermoplastic resin (b) being not substantially impregnated into the reinforcing fiber (a), and simultaneously forming the first portion and the second portion by one stroke of pressing, with a cohesive strength of the thermoplastic resin (B) and the thermoplastic resin (b) of 2 N/15 mm or larger.

The cohesive strength is measured by stacking a 15 mm-wide, 0.03 mm-thick film derived from the thermoplastic resin (B), and a 15 mm-wide, 0.03 mm-thick film derived from the thermoplastic resin (b); pressing the stack under a pressure of 0.1 MPa, at a temperature 1° C. higher than the melting point of the thermoplastic resin (B) or the thermoplastic resin (b), whichever is higher, for two seconds, so as to heat seal the films partially; pulling the films at unsealed portions in the direction 180° away from each other; and finding the force at which the heal-sealed portion separates, or the force at which the resin films were ruptured before being separated.

The cohesive strength in this invention may be measured more preferably according to the description later in EXAMPLES. Note however that if the measuring instruments described in EXAMPLES are no more available or difficult to obtain, due to discontinuance or other reasons, any equivalent instruments may be used. The same will also apply to all methods for measurement described below.

This invention will be detailed below.

FIG. 1 is a schematic drawing illustrating steps of press molding in this invention, where reference numeral 1 stands for a lower die, 2 for an upper die, 3 for a first material, and 4 for a second material. Referring to FIG. 1, the first material 3 is placed on the lower die 1, the second material 4 is placed further on the surface of the first material, and the materials are pressed under the upper die 2. Since the thermoplastic resin (B) and the thermoplastic resin (b), being combined to achieve a high cohesive strength, are selected for the first material 3 and the second material 4, respectively, so that both may be brought into tight cohesion easily by press-molding. Unlike the cases described in Patent Literature 1 and Patent Literature 2 where the prepregs are used, this invention can simultaneously form the first portion and the second portion by one stroke of pressing, from the first material and the second material. More specifically, in this invention, since the reinforcing fiber is dispersed in each of the first material and the second material, so that the thermoplastic resin can easily impregnate into the reinforcing fiber in the process of press-molding, and thereby a molded article may be obtained even if the material having the thermoplastic resin not preliminarily impregnated into the reinforcing fiber, unlike the prepregs used in the aforementioned Patent Literature 1 and Patent Literature 2, is used. The prepregs described in Patent Literature 1 and Patent Literature 2 have often been pressed again after stacked with a sheet-like or tape-like material impregnated with fiber. Now in this invention, such operation is no more necessary.

In this invention, the total volume of the second material that is placed on the surface of the first material is preferably equal to, or larger than the capacity of a recess of the upper die 2. In particular, by controlling the total volume of the second material placed on the surface of the first material equal to, or larger (typically by 2 to 20% by volume or around) than the capacity of the recess of the upper die 2, a portion of the second material that remains unhoused in the recess of the upper die 2 will reside around a part where the first portion meets the second portion, and will improve cohesiveness between them. Therefore in the molded article of this invention, the first material does not always compose the first portion, and the second material does not always compose the second portion. In particular, in a preferred embodiment, the first material and the second material mix with each other in a part of the second portion at around the point of bonding.

The molded article in this invention may have a portion other than the first portion and the second portion, and such other portion may be formed simultaneously by press-molding, or may be formed separately.

The method for manufacturing a molded article of this invention uses, as the second material in which the reinforcing fiber (a) with a length of 1 to 30 mm is dispersed in the second material, and, the thermoplastic resin (b) is not substantially impregnated into the reinforcing fiber (a), so that, as compared with the case where the prepregs described in the aforementioned Patent Literature 1 and Patent Literature 2 are used, the material is more flexible, and can suitably be shaped even when the second portion is thin. For example, the method for manufacturing a molded article of this invention is suitable for manufacture of a molded article whose second portion is 10 mm or thinner at the thinnest portion thereof, which is even may be 5 mm or thinner, and again even may be 0.5 to 2 mm. Now the thinnest portion of the second portion is a portion that gives the shortest length, when the second portion of the molded article is viewed in its arbitrary cross section.

The molded article in this invention has the first portion, and the second portion that rises up from the first portion. The first portion typically has a face such as flat surface and curved surface, although not specifically limited so long as it may be formed by press-molding. The second portion is a portion that rises up from the first portion, and is exemplified by threaded hole, rib and other three-dimensional reinforcing structure. Also the shape of the second portion is not specifically limited, so long as it may be formed by press-molding. Now the phrase "rises up from the first portion" means that the second portion is provided in a rising direction from the first portion. The rising direction may be nearly perpendicular to the first portion, or may form any angle away therefrom without departing from the spirit of this invention. The nearly perpendicular angle at which the second portion rises up is exemplified by 89° to 91°. If the upper die is designed to be openable after press-molding, it will be possible to mold ribs that have larger inclination or more complex geometries. The upper die may be parted into two blocks, or three or more blocks.

The press-molding may be conducted under a pressure of 0.5 to 10 MPa, and more preferably 0.8 to 5 MPa. Although conventional methods using pre-impregnated materials have been conducted typically at a pressure exceeding 2 MPa and not exceeding 5 MPa or around, the method of this invention requires only a small pressure of 0.8 to 2.0 MPa for molding.

The press-molding preferably takes 1 to 20 minutes, and more preferably 3 to 15 minutes. This invention is particularly beneficial from the viewpoint that only 3 to 5 minutes will be enough for allowing impregnation of the thermoplastic resin to fully proceed.

The press-molding is conducted at a temperature (die temperature, for example) more preferably 10° C. or more, and even more preferably 15° C. or more, higher than the melting point of the thermoplastic resin (B). The upper limit of the heating temperature is preferably 100° C. or less, and more preferably 80° C. or less, higher than the melting point of the thermoplastic resin (B).

With such configuration, an obtainable molded article will have therein the first portion the second portion kept under a good cohesiveness. The cohesiveness between the first portion and the second portion may be evaluated by the method described later in EXAMPLES, but may be confirmed by any other methods.

First Material

The first material used in this invention contains the reinforcing fiber (A) with a length exceeding 30 mm, and the thermoplastic resin (B), wherein the reinforcing fiber (A) is dispersed in the first material, and, the thermoplastic resin (B) is substantially not impregnated into the reinforcing fiber (A).

Now the phrase "reinforcing fiber (A) is dispersed in the first material" means that the reinforcing fiber (A) mixes with the thermoplastic resin (B) in a nearly uniform manner, without locally agglomerating therein.

This invention is also characterized in that the thermoplastic resin is not substantially impregnated into the reinforcing fiber. By press-molding the materials while keeping the reinforcing fiber dispersed therein and not impregnated with the thermoplastic resin, the first portion and the second portion may be formed simultaneously by one stroke of pressing.

Now the phrase "not substantially impregnated" means that the ratio of impregnation of the thermoplastic resin into the reinforcing fiber is 20% or less, which is preferably 15% or less, more preferably 12% or less, particularly 10% or less, even more preferably 5% or less, and furthermore preferably 1% or less.

The form of the first material is not specifically limited so long as it contains the reinforcing fiber (A) with a length exceeding 30 mm and the thermoplastic resin (B), wherein the reinforcing fiber (A) is dispersed in the first material, and, the thermoplastic resin (B) is not substantially impregnated into the reinforcing fiber (A). Non-woven fabric and commingled yarn are exemplified.

The non-woven fabric is exemplified by the one manufactured by allowing the reinforcing fiber with a length exceeding 30 mm, and the thermoplastic resin fiber that contains the thermoplastic resin (B) as the major component to disperse in a liquid, and then scooping up the fibers using a paper making technique. Also preferable is an article manufactured by allowing the later-described commingled yarn to disperse in a liquid, and then scooping it up using a paper making technique.

Also articles obtained by simply arranging, knitting or weaving the commingled yarns are preferable. In this invention, the commingled yarn, or composite materials that uses the commingled yarn, such as non-woven fabric, knitted fabric and woven fabric, are preferable. "The composite material that uses the commingled yarn" specifically means a material having therein the thermoplastic resin (B) not substantially impregnated into the reinforcing fiber (A).

The commingled yarn in this invention contains, as the fiber components thereof, the reinforcing fiber (A) with a length exceeding 30 mm, and the thermoplastic resin fiber that contains the thermoplastic resin (B).

The reinforcing fiber (A) with a length exceeding 30 mm, the thermoplastic resin (B), and the commingled yarn will be explained in sequence below.

<Reinforcing Fiber (A) with Length Exceeding 30 mm>

The reinforcing fiber (A) with a length exceeding 30 mm used in this invention is widely selectable from known fibers used for FRP. The length of the reinforcing fiber (A) is not specifically limited so long as it exceeds 30 mm, and may suitably be determined depending on the form of the first material, size of the molded article and so forth. The length typically falls in the range from 30 mm to 20,000 m.

The reinforcing fiber (A) is exemplified by glass fiber; carbon fiber; plant fiber (including Kenaf, bamboo fiber, etc.); inorganic fibers such as alumina fiber, boron fiber, ceramic fiber and metal fiber (steel fiber, etc.); and organic fibers such as aramid fiber, polyoxymethylene fiber, aromatic polyamide fiber, polyparaphenylene benzobisoxazole fiber, and ultra-high molecular weight polyethylene fiber. Among them, at least one of carbon fiber, aramid fiber and glass fiber is preferable, and at least one of carbon fiber and glass fiber is more preferable. It is particularly preferable to use carbon fiber owing to its excellent features including lightness, high strength, and high elasticity. Carbon fibers of polyacrylonitrile-base ones and pitch-base ones are preferably used. Also plant-derived carbonaceous fibers such as lignin and cellulose may also be used.

<<Treatment Agent for Reinforcing Fiber (A)>>

The reinforcing fiber (A) used in this invention is preferably treated with a treatment agent. The treatment agent is exemplified by sizing agent and surface treatment agent. Those described in paragraphs [0093] and [0094] of JP-B1-4894982 are preferably employed, the content of which is incorporated into this specification.

In a particular case where the thermoplastic resin fiber having a polar group is used as the thermoplastic resin fiber in this invention, it is preferable to treat the reinforcing fiber with a treatment agent of reinforcing fiber having a functional group that can react with the polar group on the thermoplastic resin fiber. Such functional group that can react with the polar group on the thermoplastic resin fiber typically forms a chemical bond with the thermoplastic resin fiber in the process of heat-molding. The treatment agent for the reinforcing fiber, having a functional group that can react with the polar group of the thermoplastic resin fiber, preferably functions to size the reinforcing fiber, or helps the individual fibers physically size, before heat-processed in the commingled yarn.

More specifically, the treatment agent used in this invention is preferably at least one of epoxy resin, urethane resin, silane coupling agent, water-insoluble polyamide resin and water-soluble polyamide resin, more preferably at least one of epoxy resin, urethane resin, water-insoluble polyamide resin and water-soluble polyamide resin, and even more preferably water-soluble polyamide resin.

The epoxy resin is exemplified by glycidyl compounds such as epoxyalkane, alkane diepoxide, bisphenol A-glycidyl ether, dimer of bisphenol A-glycidyl ether, trimer of bisphenol A-glycidyl ether, oligomer of bisphenol A-glycidyl ether, polymer of bisphenol A-glycidyl ether, bisphenol F-glycidyl ether, dimer of bisphenol F-glycidyl ether, trimer of bisphenol F-glycidyl ether, oligomer of bisphenol F-glycidyl ether, polymer of bisphenol F-glycidyl ether, stearyl glycidyl ether, phenyl glycidyl ether, ethylene oxide lauryl alcohol glycidyl ether, ethylene glycol diglycidyl ether, polyethylene glycol diglycidyl ether, and propylene glycol diglycidyl ether; glycidyl ester compounds such as glycidyl benzoate, glycidyl p-toluate, glycidyl stearate, glycidyl laurate, glycidyl palmitate, glycidyl oleate, glycidyl linoleate, glycidyl linolenate, and diglycidyl phthalate; and glycidylamine compounds such as tetraglycidylaminodiphenylmethane, triglycidylaminophenol, diglycidylaniline, diglycidyltoluidine, tetraglycidyl metaxylenediamine, triglycidyl cyanurate, and triglycidyl isocyanurate.

As the urethane resin, usable are for example urethane resins obtained by allowing polyol, or polyol obtained by transesterification between oils and fats and polyhydric alcohol, to react with polyisocyanate.

The polyisocyanate is exemplified by aliphatic isocyanates such as 1,4-tetramethylene diisocyanate, 1,6-hexamethylene diisocyanate, 2,2,4-trimethylhexamethylene diisocyanate, and 2,8-diisocyanate methyl caproate; alicyclic diisocyanates such as 3-isocyanate methyl-3,5,5-trimethylcyclohexyl isocyanate, and methylcyclohexyl-2,4-diisocyanate; aromatic diisocyanates such as toluylene diisocyanate, diphenylmethane diisocyanate, 1,5-naphthene diisocyanate, diphenylmethylmethane diisocyanate, tetraalkyldiphenylmethane diisocyanate, 4,4-dibenzyl diisocyanate, and 1,3-phenylene diisocyanate; chlorinated diisocyanates; and brominated diisocyanates. These compounds may be used independently, or as a mixture of two or more species.

The polyol is exemplified by various polyols typically used for manufacturing urethane resin, including diethylene glycol, butanediol, hexanediol, neopentyl glycol, bisphenol A, cyclohexane dimethanol, trimethylolpropane, glycerin, pentaerythritol, polyethylene glycol, polypropylene glycol, polyesterpolyol, polycaprolactone, polytetramethylene ether glycol, polythioether polyol, polyacetal polyol, polybutadiene polyol, and furan dimethanol. These compound may be used independently, or as a mixture of two or more species.

The silane coupling agent is exemplified by trialkoxy or triaryloxy silane compounds such as aminopropyl triethoxysilane, phenylaminopropyl trimethoxysilane, glycidyl propyl triethoxysilane, methacryloxypropyl trimethoxysilane, and vinyl triethoxysilane; ureidosilane; sulfidosilane; vinyl silane; and imidazole silane.

Now the water-insoluble polyamide resin means that, when 1 g of such polyamide resin is added to 100 g of water at 25° C., 99% by weight or more of which remains insoluble.

When the water-insoluble polyamide resin is used, it is preferable to use a powdery water-insoluble polyamide resin after dispersing or suspending it into water or organic solvent. Into the dispersion or suspension of such powdery water-insoluble polyamide resin, the comingled fiber bundle may be dipped, and then dried, to produce the commingled yarn.

The water-insoluble polyamide resin is exemplified by polyamide 6, polyamide 66, polyamide 610, polyamide 11, polyamide 12, xylylenediamine-based polyamide resin (preferably polyxylylene adipamide and polyxylylene sebacamide), and emulsified or dispersed product of these copolymers obtained by mixing powders of them with a nonionic, cationic or anionic surfactant, or mixture of these surfactant. The water-insoluble polyamide resin is commercially available as water-insoluble nylon emulsions, typically marketed under the trade names "Sepolsion PA" from Sumitomo Seika Chemicals Co., Ltd., and "Michem Emulsion" from Michaelman Inc.

Now the water-soluble polyamide resin means that, when 1 g of such polyamide resin is added to 100 g of water at 25° C., 99% by weight more of which remains dissolved in water.

The water-soluble polyamide resin is exemplified by modified polyamides such as acrylic acid-grafted N-methoxymethylated polyamide resin, and N-methoxymethylated polyamide resin bound by amido group. The water-soluble polyamide resins are marketed under the trade names "AQ-Nylon" from Toray Industries, Inc., and "To resin" from Nagase ChemteX Corporation.

The amount of treatment agent is preferably 0.001 to 1.5% by weight of the reinforcing fiber, more preferably 0.1 to 1.2% by weight, and even more preferably 0.5 to 1.1% by weight. Within these ranges, the reinforcing fiber will have an improved dispersion, and the effect of this invention will be demonstrated more effectively.

<<Method for Treating Reinforcing Fiber with Treatment Agent>>

Methods for treating the reinforcing fiber with a treatment agent may be any of known ones. For example, the reinforcing fiber may be put in a solution having the treatment agent dissolved therein, so as to allow the treatment agent to adhere onto the surface of the reinforcing fiber. The treatment agent may alternatively be blown with air onto the surface of the reinforcing fiber. It is also allowable to use the reinforcing fiber preliminarily treated with a surface treatment agent or a treatment agent, or to use commercially available products after once removing the surface treatment agent or the treatment agent, and then re-treating them again so as to make a desired amount of treatment agent retained on the surfaces thereof.

In the first material, the ratio of the reinforcing fiber (A) with a length exceeding 30 mm is preferably 30% by volume or above, more preferably 40% by volume or above, and even may be 45% by volume or above. The upper limit value may typically, but not limitatively, be 70% by volume or below, and may even be 60% by volume or below.

In the first material, the ratio of the reinforcing fiber (A) with a length exceeding 30 mm is preferably 30% by weight or above, more preferably 42% by weight or above, and even may be 55% by weight or above. The upper limit value may typically, but not limitatively, be 80% by weight or below.

<Thermoplastic Resin (B)>

The thermoplastic resin (B) used in this invention is not specifically limited without departing from the spirit of this invention, and may be widely selectable from those used for FRP, which include polyolefin resins such as polyethylene and polypropylene; polyamide resin; polyester resins such as polyethylene terephthalate and polybutylene terephthalate; and thermoplastic resins such as polycarbonate resin, polyoxymethylene resin, polyether ketone, polyethersulfone and thermoplastic polyetherimide. Polyamide resin is preferable. The thermoplastic resin composition and polyamide resin employable in this invention will be detailed later.

The thermoplastic resin (B) used in this invention may be composed of the thermoplastic resin (B) only, or may be a thermoplastic resin composition that contains the thermoplastic resin (B) as the major component. The thermoplastic resin (B) preferably accounts for 80% by weight or more of the thermoplastic resin composition, and more preferably accounts for 90 to 100% by weight.

The thermoplastic resin composition used in this invention may contain an elastomer component.

The elastomer component employable here may be any of known elastomers including polyolefin-based elastomer, diene-based elastomer, polystyrene-based elastomer, polyamide-based elastomer, polyester-based elastomer, polyurethane-based elastomer, fluorine-containing elastomer and silicone-based elastomer. Polyolefin-based elastomer and polystyrene-based elastomer are preferable. For these elastomers, also preferable are modified elastomers intended for adding compatibility with the polyamide resin, obtained by modification with α,β-unsaturated carboxylic acid or acid anhydride thereof, acrylamide, or derivatives of these compounds, under the presence or absence of a radical initiator.

The amount of addition of the elastomer component, when added to the thermoplastic resin composition, is preferably 5 to 25% by weight of the thermoplastic resin composition The thermoplastic resin composition used in this invention may contain any additive so long as the purposes and effects of this invention will not be degraded, which include stabilizers such as antioxidant and heat stabilizer, hydrolysis resistance modifier, weathering stabilizer, matting agent, UV absorber, nucleating agent, plasticizer, dispersion aid, flame retardant, antistatic agent, anti-coloring agent, anti-gelling agent, colorant and mold releasing agent. For details of these additives, paragraphs [0130] to [0155] of JP-B1-4894982 may be referred to, the content of which is incorporated into this specification. The thermoplastic resin composition used in this invention preferably, but not absolutely, contains no filler. This specifically means that the content of the filler in the thermoplastic resin composition is 3% by weight or less.

One preferred embodiment of the thermoplastic resin composition used in this invention is exemplified by an embodiment where the polyamide resin accounts for 70% by weight or more (more preferably 80% by weight or more) of the thermoplastic resin composition.

<<Polyamide Resin>>

The polyamide resin used in this invention is exemplified by polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polyamide 66/6T, XD-based polyamide (polyxylylene adipamide, polyxylylene sebacamide, polyxylylene dodecamide etc.,), polyamide 9T, polyamide 9MT, and polyamide 6I/6T.

Among the above-described polyamide resins, preferable is a polyamide resin (XD-based polyamide) that contains a diamine-derived structural unit and a dicarboxylic acid-derived structural unit, with 50 mol % or more of the diamine-derived structural unit being derived from xylylenediamine, from the viewpoints of moldability and heat resistance. The XD-based polyamide resin is more preferable when 70 mol % or more of the diamine-derived structural unit is derived from xylylenediamine, and it is even more preferable when the 90 mol % or more of the diamine-derived structural unit is derived from xylylenediamine.

When the polyamide resin is a mixture, the XD-based polyamide preferably accounts for 50% by weight or more, and more preferably 80% by weight or more, of the polyamide resin.

As for the XD-based polyamide, preferably 70 mol % or more, more preferably 80 mol % or more, and even more preferably 90 mol % or more of the diamine-derived structural unit is derived from metaxylylenediamine and/or paraxylylenediamine; and preferably 50 mol % or more, more preferably 70 mol % or more, particularly 80 mol % or more, and furthermore preferably 90 mol % or more of the dicarboxylic acid-derived structural unit is derived from straight chain aliphatic α,ω-dicarboxylic acid preferably having 4 to 20 carbon atoms.

The diamine that composes the XD-based polyamide preferably contains metaxylylenediamine, wherein 30 mol % or more, more preferably 51 mol % or more, and particularly 70 mol % or more is metaxylylenediamine.

Diamines other than metaxylylenediamine and paraxylylenediamine, employable as the source diamine component for the XD-based polyamide are exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and aromatic diamines such as bis(4-aminophenyl) ether, paraphenylene diamine, and bis(aminomethyl)naphthalene. These compounds may be used independently, or as a mixture of two or more species.

When diamines other than xylylenediamine are used as the diamine component, the ratio of content thereof is less than 50% by mole of the diamine-derived structural unit, preferably 30% by mole or less, more preferably 1 to 25% by mole, and particularly 5 to 20% by mole.

The straight-chain aliphatic α,ω-dicarboxylic acid having 4 to 20 carbon atoms, suitably used as the source dicarboxylic acid component for the polyamide resin, is exemplified by aliphatic dicarboxylic acids such as succinic acid, glutaric acid, pimelic acid, suberic acid, azelaic acid, adipic acid, sebacic acid, undecanedioic acid, and dodecanedioic acid. These compounds may be used independently, or as a mixture of two or more species. Among them, adipic acid or sebacic acid is preferable from the viewpoint of optimizing the melting point of the polyamide resin to be molded. Sebacic acid is particularly preferable.

Dicarboxylic acid component, other than the straight-chain aliphatic α,ω-dicarboxylic acid having 4 to 20 carbon atoms, is exemplified by phthalic acid compounds such as isophthalic acid, terephthalic acid, orthophthalic acid; and naphthalene dicarboxylic acids including isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. These compounds may be used independently, or as a mixture of two or more species.

When dicarboxylic acids other than the straight-chain aliphatic α,ω-dicarboxylic acid having 4 to 20 carbon atoms are used as the dicarboxylic acid component, it is preferable to use terephthalic acid or isophthalic acid, from the viewpoints of moldability and barrier performance. Ratio of terephthalic acid or isophthalic acid is preferably 30% by mole or less of the dicarboxylic acid structural unit, more preferably 1 to 30% by mole, and particularly 5 to 20% by mole.

Besides the diamine component and the dicarboxylic acid component, any copolymerizable component may be used as a component composing the polyamide resin, so long as the effects of this invention will not be degraded, wherein the component including lactams such as ε-caprolactam and laurolactam; aminocaproic acid; and aliphatic aminocarboxylic acids such as aminocaproic acid and aminoundecanoic acid.

The polyamide resin used in this invention preferably has a number-average molecular weight (Mn) or 6,000 to 30,000, more preferably 8,000 to 28,000, even more preferably 9,000 to 26,000, yet more preferably 10,000 to 24,000, and particularly 11,000 to 22,000. Within these ranges, the heat resistance, elasticity, dimensional stability and moldability will be improved.

The number-average molecular weight (Mn) in this context is calculated from the equation below, using terminal amino group concentration [$NH_2$] (microequivalents/g) and terminal carboxy group concentration [COOH] (microequivalents/g) of the polyamide resin:

Number-average molecular weight (Mn)=2,000,000/([COOH]+[$NH_2$]).

The polyamide resin used in this invention preferably has a dispersity (weight-average molecular weight/number-average molecular weight (Mw/Mn)) of 1.8 to 3.1. The dispersity is more preferably 1.9 to 3.0, and even more preferably 2.0 to 2.9. With the dispersity fallen within these ranges, the molded article with excellent mechanical properties will more likely be obtained.

The dispersity of polyamide resin is controllable by suitably selecting types and amounts of initiator or catalyst used for polymerization, or polymerization conditions including reaction temperature, pressure and time. Alternatively, the dispersity is also controllable by mixing two or more types of polyamide resins obtained under different polymerization conditions, or by subjecting the polymerized polyamide resin to fractional precipitation.

The dispersity may be determined by GPC, and may more specifically be given as standard polymethyl methacrylate (PMMA) equivalent values, through measurement by using a measuring instrument "HLC-8320GPC" from Tosoh Corporation, two sets of "TSK gel Super HM-H" columns from Tosoh Corporation, a 10 mmol/l sodium trifluoroacetate in hexafluoroisopropanol (HFIP) as an eluant, conducted under conditions including a resin concentration of 0.02% by weight, a column temperature of 40° C., and a flow rate of 0.3 ml/min, with use of a refractive index detector (RI). An analytical curve is prepared by dissolving PMMA in HFIP, at six levels of concentration.

The polyamide resin, when moistened with water, preferably has a flexural modulus retention of 85% or larger. With the flexural modulus retention under moistened condition adjusted to this level, the molded article will be less likely to degrade the physical properties under hot and humid conditions, and will be less likely to cause warping or other deformation.

The flexural modulus retention of the polyamide resin, when moistened with water, is defined by the ratio (%) of flexural modulus of a bend test specimen of polyamide resin, molded in compliance with JIS K7171, measured at a moisture content of 0.5% by weight, relative to flexural modulus measured at a moisture content of 0.1% by weight. A large value of the ratio means that the flexural modulus is less likely to decrease even under moisture. Now, the flexural modulus is a value obtained by measurement according to JIS K7171.

The flexural modulus retention under moisture is more preferably 90% is larger, and even more preferably 95% or larger.

The flexural modulus retention of polyamide resin when moistened is controllable, typically based on the ratio of mixing of paraxylylenediamine and metaxylylenediamine, wherein the larger the ratio of paraxylylenediamine will be, the better the flexural modulus retention will be. It is also adjustable by controlling the crystallinity of the bend test specimen.

Water absorption of the polyamide resin is determined by immersing the bend test specimen, molded according to JIS K7171, into water at 23° C. for one week, taking it out, wiping the water away, and then subjecting the specimen to measurement immediately thereafter. The water absorption is preferably 1% by weight or below, more preferably 0.6% by weight or below, and even more preferably 0.4% by weight or below. Within these ranges, the molded article will easily be prevented from being deformed due to absorption of water, the first portion and the second portion will be suppressed from foaming during molding typically under pressure and heating, and thereby the obtainable molded article will contain less bubbles.

The polyamide resin is suitably used when it has the terminal amino group concentration ([$NH_2$]) preferably less than 100 microequivalents/g, more preferably 5 to 75 microequivalents/g, and even more preferably 10 to 60 microequivalents/g; and the terminal carboxy group concentration ([C001-1]) preferably less than 150 microequivalents/g, more preferably 10 to 120 microequivalents/g, and even more preferably 10 to 100 microequivalents/g. By using the polyamide resin with the terminal group concentrations of these levels, the polyamide resin will have the viscosity stabilized easily when it is processed into film or fiber, and will more likely be reactive with a carbodiimide compound described later.

The polyamide resin is preferable if it has a ratio of the terminal amino group concentration relative to the terminal carboxy group concentration ([$NH_2$]/[COOH]) of 0.7 or smaller, which is more preferably 0.6 or smaller, and particularly 0.5 or smaller. The polyamide resin having the ratio larger than 0.7 will occasionally make it difficult to control the molecular weight during polymerization.

The terminal amino group concentration may be measured by dissolving 0.5 g of polyamide resin into 30 ml of phenol/methanol (4:1) mixed solvent under stirring at 20 to 30° C., and titrating the solution with a 0.01 N hydrochloric acid. The terminal carboxy group concentration may be determined by dissolving 0.1 g of polyamide resin into 30 ml of benzyl alcohol at 200° C., adding thereto 0.1 ml of phenol red solution at 160° C. to 165° C., titrating the solution with a titrant obtained by dissolving 0.132 g of KOH into 200 ml of benzyl alcohol (0.01 mol KOH/l). The end point of titration may be judged by a point where the color changes from yellow to red, and kept unchanged.

As for a method for manufacturing the polyamide resin, the description in paragraphs [0052] to [0053] of JP-A-2014-173196 may be referred to, the content of which is incorporated into this specification.

In this invention, the melting point of the polyamide resin is preferably 150 to 310° C., more preferably 180 to 300° C., and even more preferably 180 to 250° C.

The glass transition point of the polyamide resin is preferably 50 to 100° C., more preferably 55 to 100° C., and particularly 60 to 100° C. Within these ranges, the heat resistance will likely be improved.

The melting point in the context of this invention is defined by a temperature at which an endothermic peak becomes deepest in DSC (differential scanning calorimetry) during a heating process. The glass transition temperature is measured after once heating and melting a sample so as to cancel any influences of the thermal history on the crystallinity, and by heating the sample again. The measurement may be conducted typically by using "DSC-60" from Shimadzu Corporation, approximately 1 mg of the sample, and nitrogen as an atmospheric gas fed at a flow rate of 30 ml/min, wherein the polyamide resin is melted under heating at a heating rate of 10° C./min from room temperature up to a temperature not lower than a predicted melting point, and the melting point was determined by a temperature at which the endothermic peak becomes deepest. The molten polyamide resin was then rapidly cooled on dry ice, and reheated up to a temperature not lower than the melting point at a heating rate of 10° C./min, to determine the glass transition point.

Now for the case where the resin (B) is composed of two or more species of resin, the melting point of the resin (B) is represented by the melting point of the resin whose content is larger. If the resin (B) is composed of nearly equal amounts of two or more species of thermoplastic resin, the melting point of the resin (B) is represented by the melting point of the resin whose melting point is highest. If the resin (B) has two or more melting points, the melting point of the resin (B) is represented by the higher one.

For the case where the thermoplastic resin (B) is composed of two or more species of resin component, difference of the SP (solubility parameter) values of such two or more species of thermoplastic resins is preferably 3 or smaller, for an arbitrary pair.

In the first material, the ratio of the thermoplastic resin is preferably 30% by weight or more. The upper limit is preferably 70% by weight or below, more preferably 60% by weight or below, and even may be 40% by weight or below.

<Commingled Yarn>

The first material is preferably a commingled yarn that contains, as the fiber components thereof, the reinforcing fiber (A) with a length exceeding 30 mm, and the thermoplastic resin fiber that contains the thermoplastic resin (B).

The first material, when given as the commingled yarn, preferably has a dispersion of 60 to 100%, more preferably 65 to 100%, and particularly 70 to 100%. Within these ranges, the commingled yarn will have an improved uniformity of physical properties, and the molded article will have an improved appearance. A molded article manufactured using this material also will have improved mechanical properties. The dispersion of commingled yarn in this invention is defined by a value measured by a method described later in EXAMPLES.

<<Thermoplastic Resin Fiber>>

The thermoplastic resin fiber is composed of the above-described thermoplastic resin (B) or the thermoplastic resin composition. The thermoplastic resin fiber in this invention is a so-called continuous thermoplastic resin fiber, with the length suitably determined depending on the form of the first material and the size of the molded article. The thermoplastic resin fiber typically has a length exceeding 30 mm. The upper limit value may be 20,000 m or below.

The thermoplastic resin fiber used in this invention is typically manufactured by using a thermoplastic resin fiber bundle in which thermoplastic resin fibers gathered into a bundle. A single thermoplastic resin fiber bundle preferably has a total fineness of 40 to 600 dtex, more preferably 50 to 500 dtex, and even more preferably 100 to 400 dtex. Within these ranges, an obtainable commingled yarn will have therein an improved state of dispersion of the thermoplastic resin fiber. The number of fibers that composes the thermoplastic resin fiber bundle is preferably 1 to 200 f, more preferably 5 to 100 f, even more preferably 10 to 80 f, and particularly 20 to 50 f. Within these ranges, an obtainable commingled yarn will have therein an improved state of dispersion of the thermoplastic resin fiber.

In this invention, a single commingled yarn is manufactured preferably by using 1 to 100 thermoplastic resin fiber bundles, more preferably by using 1 to 50 bundles, and even more preferably by using 15 to 35 bundles. Within these ranges, the effects of this invention will be demonstrated more effectively.

The total fineness of the thermoplastic resin fiber used for manufacturing a single commingled yarn is preferably 200 to 24000 dtex, and more preferably 1000 to 12000 dtex. Within these ranges, the effects of this invention will be demonstrated more effectively.

The total number of the thermoplastic resin fibers used for manufacturing a single commingled yarn is preferably 10 to 4000 f, more preferably 20 to 2000 f, and even more preferably 200 to 1000 f. Within these ranges, the commingled yarn will have an improved commingling performance. With the number of fibers controlled to 10 f or larger, opened fibers will more likely be mixed uniformly. With the number of fibers controlled to 2000 f or smaller, a region where either fiber predominates will be less likely to be formed, and instead more uniform commingled yarn will be obtained.

The thermoplastic resin fiber bundle used in this invention preferably has a tensile strength of 2 to 10 gf/d.

<<Treatment Agent for Thermoplastic Resin Fiber>>

It is also preferable to treat the surface of the thermoplastic resin fiber used in this invention, with a treatment agent. This embodiment can improve dispersion of the reinforcing fiber in the commingled yarn. Types of the treatment agent are not specifically limited, so far as they functions to size the thermoplastic resin fiber. The treatment agent is exemplified by ester-based compound, alkylene glycol-based compound, polyolefin-based compound and phenyl ether-based compound. More specifically, surfactants are preferable.

The amount of the treatment agent for the thermoplastic resin fiber is preferably 0.1 to 2% by weight of the thermoplastic resin fiber, and more preferably 0.5 to 1.5% by weight. Within these ranges, the thermoplastic resin fiber will disperse more uniformly, and more uniform commingled yarn will likely be obtained. In the process of manufacturing the commingled yarn, the continuous thermoplastic resin fiber may occasionally be broken, due to frictional force applied by a machine or frictional force that effects among the fibers. Within the above-described ranges, the fibers may more effectively be prevented from being broken. In addition, the thermoplastic resin fiber may effectively be prevented from being broken under mechanical stress that is applied to obtain a uniform commingled yarn.

<<<Method for Treating Thermoplastic Resin Fiber with Treatment Agent>>>

Methods for treating the thermoplastic resin fiber with a treatment agent is not specifically limited, so long as they can achieve intended objectives. For example, a solution containing the treatment agent dissolved therein may be applied to the thermoplastic resin fiber, so as to allow the treatment agent to adhere onto the surface of the thermoplastic resin fiber. The treatment agent may alternatively be blown with air onto the surface of the thermoplastic resin fiber.

<<Reinforcing Fiber Used for Commingled Yarn>>

The reinforcing fiber used for the commingled yarn is so-called continuous reinforcing fiber, with the length suitably determined depending on the form of the first material and the size of the molded article.

The reinforcing fiber used for manufacturing the commingled yarn is typically a reinforcing fiber bundle in which a plurality of reinforcing fibers are gathered into a bundle. The reinforcing fiber used in this invention preferably has a total fineness of 100 to 50000 dtex per a single commingled yarn, more preferably 500 to 40000 dtex, even more preferably 1000 to 30000 dtex, and particularly 1000 to 20000 dtex. Within these rages, the process will be more simple, and an obtainable commingled yarn will have an improved elasticity and strength.

The reinforcing fiber used in this invention preferably has a total number of fibers of 500 to 50000 f per a single commingled yarn, more preferably 500 to 30000 f, even more preferably 1000 to 20000 f, and particularly 1500 to 15000 f. Within these ranges, the reinforcing fiber will be dispersed in the commingled yarn in an improved manner.

A single commingled yarn may be manufactured by using a single reinforcing fiber bundle, or by using a plurality of reinforcing fiber bundles, so long as the reinforcing fiber can satisfy a predetermined total fineness and the total number of fibers. In this invention, a single commingled yarn is manufactured preferably by using 1 to 10 reinforcing fiber bundles, more preferably using 1 to 3 reinforcing fiber bundles, and even more preferably using a single reinforcing fiber bundle.

<<Manufacture of Commingled Yarn>>

The commingled yarn is manufactured typically by using the thermoplastic resin fiber bundle and the reinforcing fiber bundle. The total fineness of fibers that are used for manufacturing a single commingled yarn (sum of the individual totals of fineness of the thermoplastic resin fibers and the reinforcing fibers that are used for manufacturing a single commingled yarn) is preferably 1000 to 100000 dtex, more preferably 1500 to 50000 dtex, even more preferably 2000 to 50000 dtex, and particularly 3000 to 15000 dtex.

The ratio of the individual totals of fineness of the thermoplastic resin fiber and the reinforcing fiber that are used for manufacturing a single commingled yarn (total of fineness of thermoplastic resin fiber/total of fineness of reinforcing fiber) is preferably 0.1 to 10, more preferably 0.1 to 6.0, and even more preferably 0.5 to 2.0.

The total of the number of fibers used for manufacturing a single commingled yarn (sum of the individual totals of the number of fibers of the thermoplastic resin fiber and the reinforcing fiber) is preferably 100 to 100000 f, more preferably 1000 to 100000 f, even more preferably 1500 to 70000 f, yet more preferably 2000 to 20000 f, furthermore preferably 2500 to 10000 f, and particularly 3000 to 5000 f. Within these ranges, the commingled yarn will have an improved commingling performance. There will be a less region where either fiber predominates, and instead both fibers will disperse with each other more uniformly.

The ratio of the individual totals of the number of fibers of the thermoplastic resin fiber and the reinforcing fiber that are used for manufacturing a single commingled yarn (total of the number of fibers of the thermoplastic resin fiber/total of the number of fibers of the reinforcing fiber) is preferably 0.001 to 1, more preferably 0.001 to 0.5, and even more preferably 0.05 to 0.2. Within these ranges, the commingled yarn will have an improved commingling performance. Again within these ranges, the thermoplastic resin fiber and the reinforcing fiber will more likely be dispersed with each other uniformly, which are intrinsically desired to be uniformly dispersed in the commingled yarn.

The commingled yarn used in this invention may be twisted. Methods for twisting may be any of known methods without special limitation. The number of turns in twisting may suitably be determined depending on types of the thermoplastic resin used for the thermoplastic resin fiber, the number of fibers and fineness of the thermoplastic resin fiber; types, the number of fibers and fineness of the reinforcing fiber; and the ratio of the number or fibers, or the ratio of fineness of the thermoplastic resin fiber and the reinforcing fiber, which is typically within the range from 1 to 200 turns/m (fiber length), more specifically 1 to 100 turns/m, even more specifically 1 to 70 turns/m, and particularly 1 to 50 turns/m. With such design, the obtainable molded article will have an improved mechanical strength.

The reinforcing fiber and/or the thermoplastic resin fiber used for the commingled yarn in this invention are preferably surface-treated with a treatment agent. With such design, the obtainable commingled yarn will have therein the reinforcing fiber and the thermoplastic resin fiber more uniformly dispersed with each other, and the ratio of impregnation of the thermoplastic resin fiber component into the reinforcing fiber, after molding, may be improved.

The commingled yarn may include an additional component other than the reinforcing fiber, the thermoplastic resin fiber, the treatment agent for the reinforcing fiber, and the treatment agent for the thermoplastic resin fiber. The additional component is exemplified by short carbon fiber, carbon nanotube, fullerene, micro cellulose fiber, talc and mica. The amount of addition of these additional components is preferably 5% by weight or less of the commingled yarn.

Second Material

The second material used in this invention contains the reinforcing fiber (a) with a length of 1 to 30 mm and the thermoplastic resin (b), wherein the reinforcing fiber (a) is dispersed in the second material, and, the thermoplastic resin (b) is not substantially dispersed in the reinforcing fiber (a).

Now the phrase "the reinforcing fiber (a) is dispersed in the second material" means that the reinforcing fiber (a) mixes with the thermoplastic resin (b) in a nearly uniform manner, rather than being locally concentrated therein.

This invention is also characterized in that the thermoplastic resin (b) is not substantially impregnated into the reinforcing fiber (a). The phrase "not substantially impregnated" is understood in the same way as for the first material, within the same preferable ranges.

The form of the second material is not specifically limited so long as the reinforcing fiber (a) with a length of 1 to 30 mm is dispersed in the second material, and, the thermoplastic resin (b) is not substantially impregnated into the reinforcing fiber (a). Specific examples include a mixture of the reinforcing fiber (a) with a length of 1 to 30 mm and a powdery thermoplastic resin (b); and a material chopped from the first material so that the reinforcing fiber will be 1 to 30 mm long. A preferred embodiment of this invention is exemplified by a material chopped into 1 to 30 mm length from a commingled yarn that contains, as the fiber components thereof, the reinforcing fiber (A) with a length exceeding 30 mm, and the thermoplastic resin fiber that contains the thermoplastic resin (B).

<Reinforcing Fiber (A) with Length of 1 to 30 mm>

The reinforcing fiber (a) with a length of 1 to 30 mm used in this invention may be widely selectable from known fibers used for FRP. The reinforcing fiber (a) is preferably 15 to 25 mm long.

Examples of materials for composing the reinforcing fiber (a) may be same as those that are used for the reinforcing fiber (A), within the same preferable ranges. More specifically, the material is preferably at least one of carbon fiber, aramid fiber and glass fiber, more preferably at least one of carbon fiber or glass fiber, and carbon fiber is more preferable.

The reinforcing fiber (a) in use is preferably treated with a treatment agent. Also examples of the treatment agent and methods for treatment are same as those described regarding the reinforcing fiber (A), within the same preferable ranges.

In the second material, the ratio of the reinforcing fiber (a) with a length of 1 to 30 mm is preferably 30% by volume or above, more preferably 40% by volume or above, and even may be 45% by volume or above. The upper limit value is typically, but not specifically limited to, 70% by volume or below, and even may be 60% by volume or above.

In the second material, the ratio of the reinforcing fiber (a) with a length of 1 to 30 mm is preferably 30% by weight or above, more preferably 42% by weight or above, and even more preferably 55% by weight or above. The upper limit value is typically, but not specifically limited to, 80% by weight or below.

<Thermoplastic Resin (b)>

Materials for composing the thermoplastic resin (b) used in this invention are exemplified by those used for the thermoplastic resin (B), within the same preferable ranges. That is, polyamide resin is preferable.

The thermoplastic resin (b) used in this invention may be composed of the thermoplastic resin (b) only, or may be composed of a thermoplastic resin composition that contains the thermoplastic resin (b) as the major component. The thermoplastic resin (b) preferably accounts for 80% by weight or more, and more preferably 90 to 100% by weight of the thermoplastic resin composition. Also as for additives that may be contained in the thermoplastic resin composition and the amounts of consumption, the description regarding the thermoplastic resin (B) may be referred to.

Now for the case where the resin (b) is composed of two or more species of resin, the melting point of the resin (b) is represented by the melting point of the resin whose content is larger. If the resin (b) is composed of nearly equal amounts of two or more species of thermoplastic resin, the melting point of the resin (b) is represented by the melting point of the resin whose melting point is highest. If the resin (b) has two or more melting points, the melting point of the resin (b) is represented by the higher one.

For the case where the thermoplastic resin (b) is composed of two or more species of resin component, difference of the SP (solubility parameter) values of such two or more species of thermoplastic resins is preferably 3 or smaller, for an arbitrary pair.

As a preferred embodiment of the thermoplastic resin composition used in this invention, exemplified is an embodiment wherein polyamide resin accounts for 70% by weight or more (preferably 80% by weight or more) of the thermoplastic resin composition. Such polyamide resin contains the diamine-derived structural unit and the dicarboxylic acid-derived structural unit, wherein 50 mol % or more of the diamine-derived structural unit is more preferably derived from xylylenediamine.

<Relation Between Reinforcing Fiber (A) with Length Exceeding 30 mm and Reinforcing Fiber (a) with a Length of 1 to 30 mm>

The reinforcing fiber (A) and the reinforcing fiber (a) may be composed of the same material, or different materials.

As one preferred embodiment of this invention, exemplified is an embodiment in which each of the ratio of the reinforcing fiber (A) with a length exceeding 30 mm in the first material, and the ratio of the reinforcing fiber (a) with a length of 1 to 30 mm, is 30% by volume or larger.

<Relation Between Thermoplastic Resin (B) and Thermoplastic Resin (b)>

The cohesive strength between the thermoplastic resin (B) and the thermoplastic resin (b) is preferably 2.2 N/15 mm or larger, more preferably 2.8 N/15 mm or larger, even more preferably 3.0 N/15 mm or larger, yet more preferably 4.0 N/15 mm or larger, furthermore preferably 8.0 N/15 mm or larger, again more preferably 8.5 N/15 mm or larger, and particularly 9.0 N/15 mm. The upper limit value of the cohesive strength is typically, but not specifically limited to, 20 N/15 mm or smaller, more preferably 15 N/15 mm or smaller, and particularly 10 N/15 mm or smaller.

As a first embodiment capable of achieving such cohesive strength, exemplified is an embodiment in which 80% by weight or more of the composition is common for the thermoplastic resin (B) and the thermoplastic resin (b).

As a second embodiment, also exemplified is an embodiment in which the same series of resin is used both for the thermoplastic resin (B) and the thermoplastic resin (b). More specifically, it is preferable that each of the thermoplastic resin (B) and the thermoplastic resin (b) independently contains, as the major components, polyolefin resin, polyamide resin, polyester resin, polyether ketone, polyethersulfone, or the thermoplastic polyetherimide; it is more preferable that each of them independently contains polyamide resin as the major component; and it is even more preferable that each of them independently contains, as the major component, a polyamide resin that contains the diamine-derived structural unit and the dicarboxylic acid-derived structural unit, wherein 50 mol % or more of the diamine-derived structural unit is derived from xylylenediamine. Now the phrase "each of the thermoplastic resin (B) and the thermoplastic resin (b) independently contains polyolefin resin as the major component" means that each of the thermoplastic resin (B) and the thermoplastic resin (b) independently contains at least one species selected from polyolefin resins as the major component (which preferably accounts for 80% by weight or more, and more preferably 90 to 100% by weight). Accordingly, a polyolefin resin as the thermoplastic resin (B) and a polyolefin resin as the thermoplastic resin (b) may have the same composition or different compositions.

As a third embodiment, also exemplified is an embodiment in which the difference between the melting points of the thermoplastic resin (B) and the thermoplastic resin (b) is 70° C. or smaller, preferably 50° C. or smaller, and particularly 10° C. or smaller.

As a fourth embodiment, also exemplified is an embodiment in which an adhesive is added to either one of the thermoplastic resin (B) and the thermoplastic resin (b), so as to enhance the cohesive strength between them. The adhesive in this case is preferably an adhesive (thermoplastic resin adhesive) that contains a thermoplastic resin as the major component.

Material that composes the thermoplastic resin adhesive used in this invention is exemplified by those obtained by modifying polyolefin by grafting unsaturated carboxylic acid or the anhydride thereof, which have been widely used as thermoplastic resin adhesives. As the polyolefin, preferably used is polypropylene and polyethylene, and more preferably used is polyethylene. Specific examples of the unsaturated carboxylic acid include acrylic acid, methacrylic acid, α-ethylacrylic acid, maleic acid, fumaric acid, itaconic acid, citraconic acid, tetrahydrophthalic acid, chloromaleic acid, butenylsuccinic acid, and anhydrides of these compounds. Among them, maleic acid and maleic anhydride are preferably used. Methods for obtaining acid-modified polyolefins by modifying the polyolefins by grafting thereto the unsaturated carboxylic acid or the anhydrides thereof may be widely selectable from a variety of known methods. Exemplified is a method for adding a grafting monomer to a polyolefin that is kept melted in an extruder or the like, and allowing them to copolymerize; a method for adding a grafting monomer to a polyolefin that is kept dissolved in a solvent, and allowing them to copolymerize: and a method for adding a grafting monomer to a polyolefin that is kept suspended in water, and allowing them to copolymerize.

The amount of addition of the adhesive, when used, may be 0.01 to 30% by weight of the amount of the thermoplastic resin (B) or the thermoplastic resin (b).

Of course, two or more embodiments selected from the first to fourth embodiments may be combined. In this invention, an embodiment that satisfies at least one of the first embodiment and or second embodiment is preferable.

As described above, in this invention, the cohesive strength between a predetermined film derived from the thermoplastic resin (B), and a predetermined film derived from the thermoplastic resin (b) is not smaller than a predetermined value. When the thermoplastic resin (B) and/or the thermoplastic resin (b) are composed of two or more species of resin components, such two or more species of resins that are used for cohesive strength test need to be thoroughly mixed before use. Method for mixing is exemplified by kneading using an extrusion screw.

When the cohesive strength between the thermoplastic resin (B) and the thermoplastic resin (b) is small, there may be disclosed an invention that includes placing an adhesive onto the surface of the first material, and then placing the second material onto the surface of the adhesive.

More specifically, exemplified is a method for manufacturing a molded article that has the first portion, and the second portion that rises up from the first portion, the method includes: placing an adhesive, on the surface of the first material; the first material containing the reinforcing fiber (A) with a length exceeding 30 mm and the thermoplastic resin (B), the reinforcing fiber (A) being dispersed in the first material, and, the thermoplastic resin (B) being not substantially impregnated into the reinforcing fiber (A), placing the second material on the surface of the adhesive; the second material containing the reinforcing fiber (a) with a length of 1 to 30 mm and the thermoplastic resin (b), the reinforcing fiber (a) being dispersed into the second material, and, the thermoplastic resin (b) being not substantially impregnated into the reinforcing fiber (a), and simultaneously forming the first portion and the second portion by one stroke of pressing.

Now the adhesive is preferably a thermoplastic resin adhesive. The thermoplastic resin adhesive is specifically exemplified by the above-described thermoplastic resin adhesive, within the same preferable ranges.

The form of the thermoplastic resin adhesive may be powder, fiber, film or the like, without special limitation.

Such embodiment of this invention is exemplified by Reference Example 1 described later.

<Applications of Molded Article>

The molded article obtained by the manufacturing method of this invention is versatile in various fields including automobile and other transport equipment parts, general machinery parts, precision equipment parts, electronic/electric equipment parts, office automation equipment parts, building material/housing equipment parts, medical device, leisure time/sport goods, playing tools, medical supplies, daily goods including food wrapping film, and defense/aerospace products, without special limitation.

EXAMPLES

This invention will further be detailed below, referring to Examples. All materials, amounts of consumption, ratios, process details and procedures described in Examples below may suitably be modified, without departing from the spirit of this invention. Therefore, the scope of this invention will never be limited by the specific Examples below.

The following materials were used.

1. Thermoplastic Resin

<Exemplary Synthesis 1: MPXD10>

Into a reaction vessel equipped with a stirrer, a partial condenser, a total condenser, a thermometer, a dropping funnel, a nitrogen feeding pipe, and a strand die, placed were 10 kg (49.4 mol) of sebacic acid (TA grade, from Itoh Oil Chemicals Co., Ltd.) and 11.66 g of sodium acetate/sodium hypophosphite monohydrate (molar ratio=1/1.5), the atmosphere was thoroughly replaced with nitrogen gas, and the content was allowed to melt under heating up to 170° C., while stirring under a low flow rate of nitrogen gas.

To the molten sebacic acid kept under stirring, 6.647 kg of mixed xylylenediamine containing metaxylylenediamine (from Mitsubishi Gas Chemical Company) and paraxylylenediamine (from Mitsubishi Gas Chemical Company), whose molar ratio is 70/30 was added dropwise, and the inner temperature was continuously elevated over 2.5 hours up to 240° C., while removing the condensed water out of the system.

After completion of the dropwise addition, the inner temperature was elevated, the inner pressure of the vessel was reduced when the inner temperature reached 250° C., the inner temperature was further elevated, and kept at 255° C. for 20 minutes so as to allow the melt polycondensation to proceed. The system was then pressurized with nitrogen gas, the resultant polymer was drawn out through the strand die, and then pelletized, to obtain polyamide resin MPXD10.

The thus obtained polyamide resin was found to have a melting point of 213° C., and a number-average molecular weight of 15,400.

<Exemplary Synthesis 2: MXD10>

Polyamide resin MXD10 was obtained in the same way as in Exemplary Synthesis 1, except that the mixed xylylenediamine containing metaxylylenediamine and paraxylylenediamine was replaced with an equal amount of metaxylylenediamine.

The thus obtained polyamide resin was found to have a melting point of 190° C., and a number-average molecular weight of 14,900.

Polyamide 66 (PA66): CM3001N, from Toray Industries, Inc., m.p.=265° C.

Polypropylene resin (PP): Novatec PP, BCO3GSN, from Japan Polypropylene Corporation, m.p.=165° C.

MXD6: metaxylylene adipamide, from Mitsubishi Gas Chemical Company, m.p.=237° C.

Thermoplastic resin adhesive: Modic P55, from Mitsubishi Chemical Corporation, unsaturated carboxylic acid-modified polyolefin resin 2. Reinforcing Fiber Carbon fiber: T700-12000-60E, from Toray Industries, Inc., 8000 dtex, number of fibers=12000 f, continuous reinforcing fiber, surface-treated with epoxy resin.

3. Manufacture of Thermoplastic Resin Fiber

Thermoplastic resins listed in Table below were processed into fibers according to the procedures below.

Each thermoplastic resin was melted in a single screw extruder with a 30 mm diameter screw, and extruded through a 60-hole die into strands, stretched while being taken up on a roll, to obtain a wound article of thermoplastic resin fiber bundle. The melting temperature was set to 300° C. for polyamide resin, and set to 200° C. for polypropylene resin.

The weight per 1 m of the thus obtained thermoplastic resin fiber was measured, and converted to fineness.

4. Manufacture of Commingled Yarn, and Fabric Using Commingled Yarn

The commingled yarn was manufactured according to the method below.

The thermoplastic resin fiber and the reinforcing fiber listed in Table 1 below were respectively drawn out from the wound articles of the thermoplastic resin fiber and the reinforcing fiber, and blown with air to open them. When opened, the thermoplastic resin fiber and the reinforcing fiber were gathered into one bundle, and further blown with air while they are allowed to pass through a plurality of guides to improve uniformity. The commingled yarn was thus obtained.

The thus obtained comingled yarn was then twisted to make 10 turns per 1 m. When twisted, the commingled yarn was fixed at one end, and rotated clockwise at the other end.

The thus obtained commingled yarn was woven into a plain weave fabric using a rapier loom. The thus obtained commingled yarn fabric was found to have a weight of 730 g/m².

(Measurement of Dispersion)

The dispersion of the commingled yarn was observed and measured as described below.

The commingled yarn was cut, embedded into an epoxy resin, the embedded commingled yarn was polished on its cross section taken perpendicular to the longitudinal direction, and the cross section was photographed under a ultradepth 3D profiling color microscope VK-9500 (controller unit)/VK-9510 (measurement unit) (from Keyence Corporation). As illustrated in FIG. 4, six additional lines were radially drawn on the obtained image at regular angular intervals, and the length of regions of the reinforcing fiber, fallen on each of the additional lines, were measured and denoted as a1, a2, a3 . . . ai (i=n). Also the length of regions of the thermoplastic resin fiber, fallen on each of the additional lines, were measured and denoted as b1, b2, b3 . . . bi (i=m). The dispersion was calculated by the equation below.

$$\left[1-\left(\frac{1}{n \text{ or } m} \times \frac{\sum_{i=1}^{n \text{ or } m}(a_i \text{ or } b_i)}{\sum_{i=1}^{n \text{ or } m}(a_i)+\sum_{i=1}^{n \text{ or } m}(b_i)}\right)\right] \times 100(\%)$$ [Mathematical Formula 1]

(Measurement of Impregnation Ratio)

The commingled yarn was cut, embedded into an epoxy resin, the embedded commingled yarn was polished on its cross section taken perpendicular to the longitudinal direction, and the cross section was photographed under a ultradepth 3D profiling color microscope VK-9500 (controller unit)/VK-9510 (measurement unit) (from Keyence Corporation). On the thus obtained cross-sectional image, regions of the continuous reinforcing fiber having the molten thermoplastic resin fiber component impregnated therein were selected using image analysis software ImageJ, and the areas were measured. The impregnation ratio was given by percentage of the areas of the regions where the thermoplastic resin component was impregnated into the continuous reinforcing fiber, relative to the photographed cross-sectional area. The unit was shown by %.

TABLE 1

|  | Commingled Yarn 1 | Commingled Yarn 2 | Commingled Yarn 3 | Commingled Yarn 4 | Commingled Yarn 5 |
| --- | --- | --- | --- | --- | --- |
| Type of Resin | MPXD10 | MXD10 | PA66 | PP | MXD6 |
| Fineness of Resin Fiber | 4884 | 4884 | 4905 | 4738 | 5814 |
| Type of Reinforcing Fiber | Carbon Fiber | Carbon Fiber | Carbon Fiber | Carbon Fiber | Carbon Fiber |
| Content Ratio of Reinforcing Fiber of Commingled Yarn | 50 | 50 | 50 | 50 | 50 |
| Dispersion of Commingled Yarn | 76 | 71 | 70 | 65 | 72 |
| Impregnation Ratio of Commingled Yarn | 0 | 0 | 0 | 0 | 0 |

In Table above, the fineness is given in dtex. The ratio of the reinforcing fiber in the commingled yarn is given in % by volume. Both of the dispersion and the ratio of impregnation are given in %.

Example 1

(Manufacture of Molded Article)

On a lower die (200×200 (mm)) of a press machine (a 65-ton press machine with a 380 mm square platen, from Otake Kikai Kogyo K.K.), two sheets of commingle yarn fabric cut into 200 mm long were stacked as the first material. Next, 2 g of a commingled yarn cut into 20 mm length was put, as the second material, on the surface of the commingled yarn so as to be positioned nearly corresponding to the recess of the upper die. The cut pieces of the commingled yarn are oriented randomly. Next in order to form a protruded part (second portion), having a shape illustrated in FIG. 3, perpendicularly onto the surface of the first portion, placed was an upper die having a cuboid recess of 20 mm deep, with a 2 mm×20 mm opening. The materials were then pressed under a pressure of 3 MPa, at a die temperature (° C.) and for a time (minutes) listed in Table 2, to obtain a molded article. The die temperature was set 25° C. higher than the melting point of the thermoplastic resin (B) or the thermoplastic resin (b), whichever is higher.

The commingled yarns as the first material and the second material were those listed in Table 1, which were used according to the combination listed in Table 2.

(Cohesive Strength)

At room temperature, the cohesiveness between the thermoplastic resins used for the first material and the second material was measured according to the method below.

Using an extruder (PTM-30, from PLABOR Research Laboratory of Plastics Technology Co., Ltd.), the thermoplastic resin (B) (the resin composing the first material) was molded by extrusion at a temperature 30° C. higher than the melting point of the resin (B), to obtain a film of the thermoplastic resin (B), 170 mm wide and 0.03 mm thick (referred to as "resin (B) film", hereinafter). Similarly, using the extruder, the thermoplastic resin (b) (the resin composing the second material) was molded by extrusion at a temperature 30° C. higher than the melting point of the resin (b), to obtain a film of the thermoplastic resin (b), 170 mm wide and 0.03 mm thick (referred to as "resin (b) film", hereinafter).

From each of the thus obtained resin (B) film and resin (b) film, a 100 mm×100 mm square film was cut out as illustrated in FIG. 4, and the resin (B) film and the resin (b) film were then stacked. The thus stacked thermoplastic resin films (reference numeral 5 in FIG. 4) were protected with Kapton film, set on a heat seal tester from Toyo Seiki Seisaku-sho, Ltd. (Model C-341600502), pressed under heating at a portion represented by numeral "6" in FIG. 4, to partially seal the resin (B) film and the resin (b) film under heating. Heat sealing was conducted at a gauge pressure of 0.1 MPa, so that the resin (B) film and the resin (b) film are kept heated at a press temperature (° C.) listed in Table below, for a duration of press time (second) listed in Table below. Note that the press temperature is a temperature 1° C. higher than the melting point of the thermoplastic resin (B) or the thermoplastic resin (b), whichever is higher.

The thus heat-sealed thermoplastic resin films were transferred to an environment at 23° C. with a relative humidity of 50%, for succeeding processes. From the heat-sealed thermoplastic resin films, a portion of 15 mm wide and 90 mm long was cut out as illustrated in FIG. 4, a chuck was attached to each of the resin (B) film and the resin (b) film at a point 60 mm recessed from the right side, in FIG. 4, of the thus cut-out thermoplastic resin film 7. The films were then pulled in the direction 180° away from each other at a tensile speed of 300 mm/min as illustrated in FIG. 5, using a tensile tester (Strograph EII, from Toyo Seiki Seisaku-sho, Ltd.), to thereby find the force at which the heal-sealed portion separates when the heat-sealed face (hatched portion in FIGS. 4 and 5) caused separation; or to find the force at which the resin films rupture when the films ruptured before being separated. The cohesive strength was given by an average value obtained from the measurement repeated five times. Note that a plurality of portions of 15 mm wide and 90 mm long may be cut-out from the 100 mm×100 mm square film.

(Cohesiveness Between First Portion and Second Portion)

The thus obtained molded article 10 was placed, as illustrated in FIG. 6, so that the second portion is arranged nearly in parallel to a stage 12, and that the first portion 13 is fixed, at the end thereof brought into contact with the stage 12, to the stage 12. A 100 g weight was suspended from the second portion 11, at a point 3 mm recessed from the right end, and allowed to stand still for 60 seconds. The cohesiveness between the first portion and the second portion was evaluated as follows:

A: first portion and second portion kept bonded during testing;

B: first portion and second portion separated after elapse of 10 seconds or longer, when applied with force; and C: first portion and second portion did not bond, or separated within 10 seconds after applied with force.

Other Examples, Comparative Example

Molded articles of Examples 2 to 6 and Comparative Example 1 were manufactured in the same way as in Example 1, except that the commingled yarn fabric, commingled yarn, and conditions were altered as listed in Table 2.

A molded article of Reference Example 1 was manufactured in the same way as in Example 1, except that, after the commingled yarn fabrics as the first material were stacked, a thermoplastic resin adhesive was placed on the surface thereof, and that the second material was replaced with the commingled yarn listed in Table 2. The thermoplastic resin adhesive was used after being pulverized using a grinding mill from Morita Seiki Kogyo K.K.

Results are shown in Table 2.

TABLE 2

|  | Example 1 | Example 2 | Example 3 | Example 4 | Example 5 | Example 6 | Reference Example 1 | Comparative Example 1 |
|---|---|---|---|---|---|---|---|---|
| Cohesive Strength (N/15 mm) | 9.1 | 9.1 | 8.8 | 8.6 | 2.9 | 6.7 | 4.2 | 0.4 |
| Press Temperature of Film (° C.) | 214 | 214 | 191 | 214 | 266 | 238 | 214 | 214 |
| Press Time of Film (second) | 2 | 2 | 2 | 2 | 2 | 2 | 2 | 2 |
| Cohesiveness between First Portion and Second Portion | A | A | A | A | B | A | A | C |
| First Material (Commingled Yarn Fabrics) | Commingled Yarn 1 | Commingled Yarn 1 | Commingled Yarn 2 | Commingled Yarn 1 | Commingled Yarn 1 | Commingled Yarn 5 | Commingled Yarn 1 | Commingled Yarn 1 |
| Second Material (Commingled Yarn) | Commingled Yarn 1 | Commingled Yarn 1 | Commingled Yarn 2 | Commingled Yarn 2 | Commingled Yarn 3 | Commingled Yarn 2 | Commingled Yarn 4 | Commingled Yarn 4 |
| Adhesive | Absence | Absence | Absence | Absence | Absence | Absence | Presence | Absence |
| Temperature of Die of Molded Article (° C.) | 238 | 238 | 215 | 238 | 290 | 262 | 238 | 238 |
| Press Time of Molded Article (minute) | 10 | 3 | 10 | 5 | 10 | 10 | 10 | 10 |

The cohesive strength is given in N/15 mm, because this represents the force necessary for separating the 15 mm wide films.

Example 7

A molded article was manufactured in the same way as in Example 1, except that a mixture of powdery MPXD10 and a carbon fiber cut into 5 mm length was used in place of the second material.

REFERENCE SIGNS LIST 1 lower die
2 upper die
3 first material
4 second material
5 thermoplastic resin film
6 portion pressed under heating
7 portion cut out from thermoplastic resin
10 molded article
11 second portion
12 stage
13 first portion

The invention claimed is:

1. A method for manufacturing a molded article that has a first portion, and a second portion that rises up from the first portion, the method comprising:
   placing a second material on a surface of a first material;
   the first material being a non-woven fabric and/or a commingled yarn,
   the non-woven fabric containing a reinforcing fiber (A) with a length exceeding 30 mm and a thermoplastic resin fiber that contains a thermoplastic resin (B) as a major component, the reinforcing fiber (A) being dispersed in the first material, and the thermoplastic resin (B) being not substantially impregnated into the reinforcing fiber (A),
   the commingled yarn containing, as a fiber component thereof, the reinforcing fiber (A) with a length exceeding 30 mm, and the thermoplastic resin fiber that contains the thermoplastic resin (B),
   the second material containing a reinforcing fiber (a) with a length of 1 to 30 mm and a powdery thermoplastic resin (b) and/or a material chopped from the first material so that the reinforcing fiber will be 1 to 30 mm long, the reinforcing fiber (a) being dispersed into the second material, and the thermoplastic resin (b) being not substantially impregnated into the reinforcing fiber (a), and
   simultaneously forming the first portion and the second portion, using the second material placed on the surface of the first material, by one stroke of pressing, with a cohesive strength of the thermoplastic resin (B) and the thermoplastic resin (b) of 2 N/15 mm or larger,
   where the cohesive strength being measured by stacking a 15 mm-wide, 0.03 mm-thick film derived from the thermoplastic resin (B), and a 15 mm-wide, 0.03 mm-thick film derived from the thermoplastic resin (b); pressing the stack under a pressure of 0.1 MPa, at a temperature 1° C. higher than the melting point of the thermoplastic resin (B) or the thermo-plastic resin (b), whichever is higher, for two seconds, so as to heat seal the films partially; pulling the films at unsealed portions in the direction 180° away from each other; and finding the force at which the heal-sealed portion separates, or the force at which the resin films rupture before being separated,
   during the formation of the first portion and second portion, the thermoplastic resin (B) is impregnated into the reinforcing fiber (A) and the thermoplastic resin (b) is impregnated into the reinforcing fiber (a) and the reinforcing fiber (A).

2. The method for manufacturing a molded article of claim 1, wherein the first material is a commingled yarn that contains, as the fiber components thereof, the reinforcing fiber (A) with a length exceeding 30 mm, and a thermoplastic resin fiber that contains the thermoplastic resin (B); or, a composite material that uses the commingled yarn.

3. The method for manufacturing a molded article of claim 1, wherein the second material is a material chopped into 1 to 30 mm length from a comingled yarn that contains, as the fiber components thereof, the reinforcing fiber (A) with a length exceeding 30 mm, and a thermoplastic resin fiber that contains the thermoplastic resin (B).

4. The method for manufacturing a molded article of claim 1, wherein each of the thermoplastic resin (B) and the thermoplastic resin (b) independently contain, as the major component thereof, polyolefin resin, polyamide resin, polyester resin, polyether ketone, polyethersulfone, or thermoplastic polyetherimide.

5. The method for manufacturing a molded article of claim 1, wherein each of the thermoplastic resin (B) and the thermoplastic resin (b) independently contains a polyamide resin as the major component.

6. The method for manufacturing a molded article of claim 1, wherein each of the thermoplastic resin (B) and the thermoplastic resin (b) independently contains, as the major component, a polyamide resin that contains a diamine-derived structural unit and a dicarboxylic acid-derived structural unit, where 50 mol % or more of the diamine-derived structural unit being derived from xylylenediamine.

7. The method for manufacturing a molded article of claim 1, wherein the second portion is 10 mm wide or thinner at the thinnest portion thereof.

8. The method for manufacturing a molded article of claim 1, wherein each of the reinforcing fiber (A) with a length exceeding 30 mm, and the reinforcing fiber (a) with a length of 1 to 30 mm, is at least one of carbon fiber, aramid fiber and glass fiber.

9. The method for manufacturing a molded article of claim 1, wherein each of the ratio of reinforcing fiber (A) with a length exceeding 30 mm in the first material, and the ratio of the reinforcing fiber (a) with a length of 1 to 30 mm in the second material, is 30% by volume or larger.

10. The method for manufacturing a molded article of claim 2, wherein each of the thermoplastic resin (B) and the thermoplastic resin (b) independently contain, as the major component thereof, polyolefin resin, polyamide resin, polyester resin, polyether ketone, polyethersulfone, or thermoplastic polyetherimide.

11. The method for manufacturing a molded article of claim 2, wherein each of the thermoplastic resin (B) and the thermoplastic resin (b) independently contains a polyamide resin as the major component.

12. The method for manufacturing a molded article of claim 2, wherein each of the thermoplastic resin (B) and the thermoplastic resin (b) independently contains, as the major component, a polyamide resin that contains a diamine-derived structural unit and a dicarboxylic acid-derived structural unit, where 50 mol % or more of the diamine-derived structural unit being derived from xylylenediamine.

13. The method for manufacturing a molded article of claim 2, wherein the second portion is 10 mm wide or thinner at the thinnest portion thereof.

14. The method for manufacturing a molded article of claim 2, wherein each of the reinforcing fiber (A) with a length exceeding 30 mm, and the reinforcing fiber (a) with a length of 1 to 30 mm, is at least one of carbon fiber, aramid fiber and glass fiber.

15. The method for manufacturing a molded article of claim 2, wherein each of the ratio of reinforcing fiber (A) with a length exceeding 30 mm in the first material, and the ratio of the reinforcing fiber (a) with a length of 1 to 30 mm in the second material, is 30% by volume or larger.

16. The method for manufacturing a molded article of claim 3, wherein each of the thermoplastic resin (B) and the thermoplastic resin (b) independently contains a polyamide resin as the major component.

17. The method for manufacturing a molded article of claim 3, wherein each of the thermoplastic resin (B) and the thermoplastic resin (b) independently contains, as the major component, a polyamide resin that contains a diamine-derived structural unit and a dicarboxylic acid-derived structural unit, where 50 mol % or more of the diamine-derived structural unit being derived from xylylenediamine.

18. The method for manufacturing a molded article of claim 3, wherein the second portion is 10 mm wide or thinner at the thinnest portion thereof.

19. The method for manufacturing a molded article of claim 3, wherein each of the reinforcing fiber (A) with a length exceeding 30 mm, and the reinforcing fiber (a) with a length of 1 to 30 mm, is at least one of carbon fiber, aramid fiber and glass fiber.

20. The method for manufacturing a molded article of claim 1, wherein the second material has a thickness of 10 mm or less at a thinnest portion thereof.

21. A method for manufacturing a molded article that has a first portion, and a second portion that rises up from the first portion, the method comprising:
placing a second material on a surface of a first material;
the first material being a commingled yarn containing, as a fiber component thereof, a reinforcing fiber (A) with a length exceeding 30 mm and a thermoplastic resin fiber that contains a thermoplastic resin (B), the reinforcing fiber (A) being dispersed in the first material, and, the thermoplastic resin (B) being not substantially impregnated into the reinforcing fiber (A), and
the second material is a material chopped into 1 to 30 mm length from a comingled yarn that contains, as the fiber components thereof, the reinforcing fiber (A) with a length exceeding 30 mm, and a thermoplastic resin fiber that contains a thermoplastic resin (b), the reinforcing fiber (A) being dispersed into the second material, and, the thermoplastic resin (b) being not substantially impregnated into the reinforcing fiber (A), and
simultaneously forming the first portion and the second portion, using the second material placed on the surface of the first material, by one stroke of pressing, with a cohesive strength of the thermoplastic resin (B) and the thermoplastic resin (b) of 2 N/15 mm or larger,
where the cohesive strength being measured by stacking a 15 mm-wide, 0.03 mm-thick film derived from the thermoplastic resin (B), and a 15 mm-wide, 0.03 mm-thick film derived from the thermoplastic resin (b); pressing the stack under a pressure of 0.1 MPa, at a temperature 1° C. higher than the melting point of the thermoplastic resin (B) or the thermo-plastic resin (b), whichever is higher, for two seconds, so as to heat seal the films partially; pulling the films at unsealed portions in the direction 180° away from each other; and finding the force at which the heal-sealed portion separates, or the force at which the resin films rupture before being separated,
during the formation of the first portion and second portion, the thermoplastic resin (B) is impregnated into the reinforcing fiber (A) and the thermoplastic resin (b) is impregnated into the reinforcing fiber (A).

22. The method for manufacturing a molded article of claim 21, wherein the second material has a thickness of 10 mm or less at a thinnest portion thereof.

* * * * *